United States Patent [19]

Neeser

[11] Patent Number: 5,234,035
[45] Date of Patent: Aug. 10, 1993

[54] BULK DELIVERY SYSTEM FOR CARBONATED BEVERAGES

[75] Inventor: Timothy A. Neeser, Burnsville, Minn.

[73] Assignee: Minnesota Valley Engineering, Inc., New Prague, Minn.

[21] Appl. No.: 817,523

[22] Filed: Jan. 6, 1992

[51] Int. Cl.[5] .............................................. B65B 3/04
[52] U.S. Cl. .......................................... 141/1; 141/9; 141/65; 141/67; 141/104; 141/231; 141/248; 141/382
[58] Field of Search ...................... 141/1, 7, 9, 65, 66, 141/67, 104, 231, 248, 234, 382, 387, 389; 222/400.7, 400.8, 1

[56] References Cited

U.S. PATENT DOCUMENTS

| | | | |
|---|---|---|---|
| 4,553,573 | 11/1985 | McGarrah | 141/98 |
| 4,601,409 | 7/1986 | DiRegolo | 222/1 |
| 4,640,323 | 2/1987 | Norcia et al. | 141/18 |
| 4,641,693 | 2/1987 | Rakucewicz | 141/98 |
| 4,683,921 | 8/1987 | Neeser | 141/1 |
| 4,756,346 | 7/1988 | Radosevich et al. | 141/9 |
| 5,174,354 | 12/1992 | Neeser et al. | 141/5 |

Primary Examiner—Ernest G. Cusick
Attorney, Agent, or Firm—Rockey, Rifkin and Ryther

[57] ABSTRACT

A supply tank having a plurality of dip tubes extending therein is provided. One dip tube is provided for each storage tank that is to be filled by the supply tank. The dip tubes are of different lengths, and their lengths are related to the amount of syrup each dip tube is to deliver. A source of compressed gas communicates with the tank to force the syrup in the tank up the desired dip tube and into the delivery line connected to the onsite syrup storage tank. When the level of syrup in the tank falls below the end of the dip tube through which delivery is being made, the flow of fluid therethrough stops, and the compressed gas forces all of the syrup in the delivery line into the storage tank. By controlling the length of the dip tubes the amount of syrup delivered can be controlled.

11 Claims, 1 Drawing Sheet

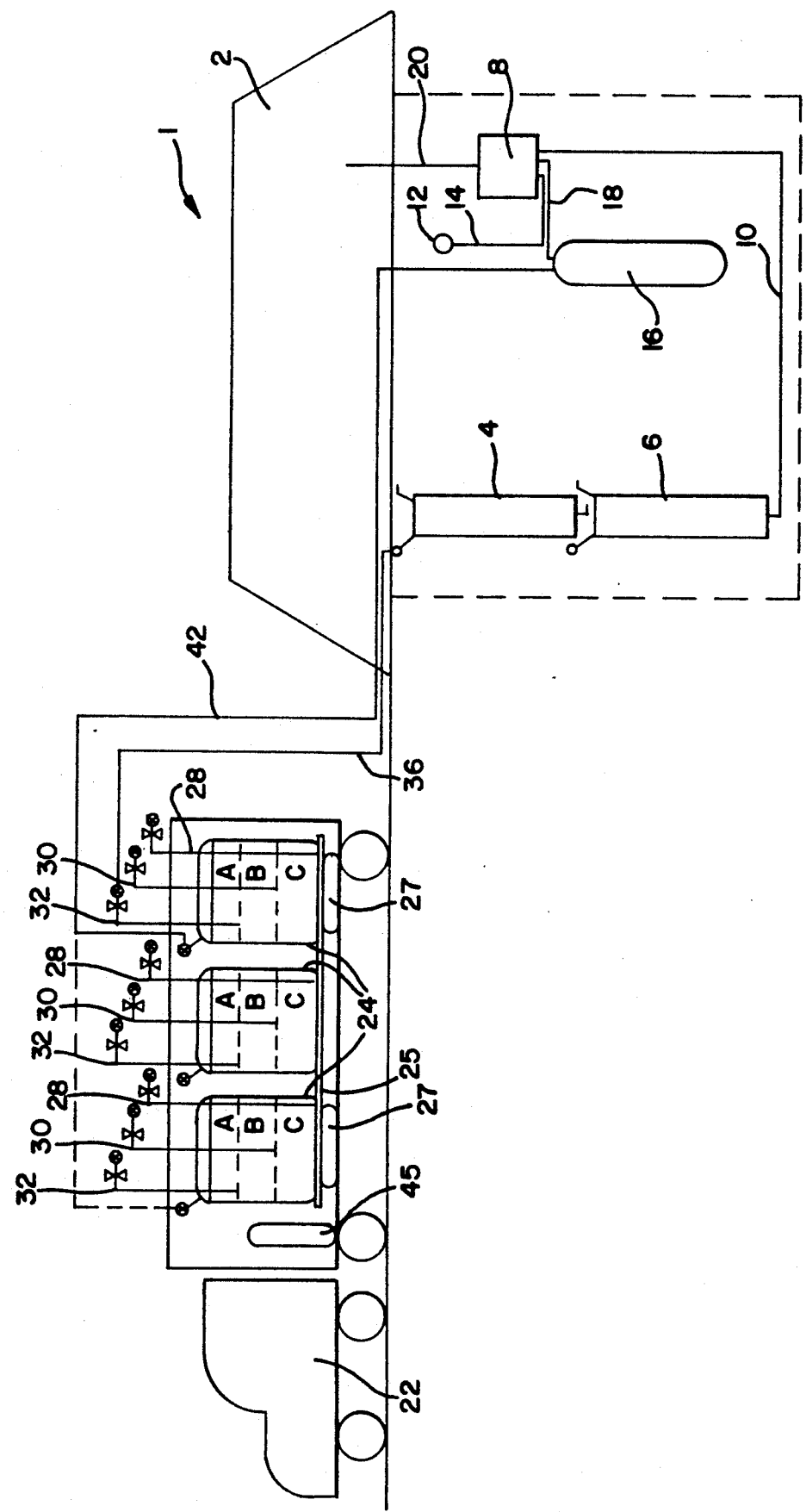

BULK DELIVERY SYSTEM FOR CARBONATED BEVERAGES

BACKGROUND OF THE INVENTION

The invention relates, generally, to carbonated beverage delivery systems, and, more particularly, to a supply tank for such systems that automatically delivers a predetermined amount of beverage components.

As is known in the art, a typical carbonated beverage delivery system includes separate sources of carbon dioxide, syrup and water stored separately. These beverage components are mixed together in the appropriate amounts to produce a desired carbonated beverage. Such beverage systems are typically found in fast food restaurants and other similar establishments where carbonated beverages are sold in large quantities. One such beverage system is disclosed in U.S. Pat. No. 4,683,921 issued to Nesser.

Typically, the syrup is stored in one or two storage tanks on the premises of the establishment which are periodically resupplied from a semi-trailer having a large volume syrup supply tank. These supply tanks typically have a capacity sufficient to supply three or more restaurant storage tanks. Unfortunately, the existing supply tanks do not include a reliable and inexpensive metering means for accurately measuring the amount of syrup delivered from the supply tank to each storage tank. This shortcoming is significant because syrup suppliers and purchasers are very sensitive to and demand that the amount of syrup ordered equals the precise amount of syrup actually delivered.

Thus, a syrup supply tank that can automatically meter a precise, known amount of syrup to a carbonated beverage system storage tank thereby to prevent over or under filling is desired.

OBJECTS OF THE INVENTION

It is a general object of the invention to provide an improved syrup delivery system that prevents over and under filling.

It is another object of the invention to provide an improved syrup supply tank that automatically stops syrup delivery when a desired amount of syrup has been delivered.

It is a further object of the invention to provide a syrup delivery system that automatically flushes clean the syrup supply line after each delivery.

Other objects of the invention, in addition to those set forth above, will become apparent to one of ordinary skill in the art from the following description of the invention.

SUMMARY OF THE INVENTION

The present invention overcomes the shortcomings of the prior art, and consists of a delivery tank having a plurality of dip tubes extending therein. One dip tube is provided for each storage tank that is to be filled from the delivery tank. The dip tubes are of different lengths (measured from the top), and their lengths are related to the amount of syrup each dip tube is to deliver. A source of compressed gas communicates with the truck mounted delivery tank to force the syrup in the tank up the desired dip tube and into the delivery line connected to the restaurant's syrup storage tank. When the level of syrup in the tank falls below the end of the selected dip tube, the flow of fluid therethrough stops, and the compressed gas forces all of the syrup in the delivery line into the storage tank. By accurately positioning the dip tubes, the amount of syrup delivered can be precisely metered.

BRIEF DESCRIPTION OF THE DRAWINGS

The FIGURE shows a schematic view of the supply tank of the invention in association with an on-site carbonated beverage delivery system.

DETAILED DESCRIPTION OF THE INVENTION

Referring more particularly to the FIGURE, the typical beverage system is shown schematically at 1 in the basement of a fast food restaurant 2. System 1 consists of a pair of syrup storage tanks 4 and 6 which store syrup for delivery to mixing valve 8 via line 10. The syrup is alternately used first from tank 4 and then from tank 6 such that one of the tanks can be refilled while the other delivers syrup to valve 8 whereby the flow of syrup to valve 8 is not interrupted.

Water from a source 12, such as a tap, is delivered to mixing valve 8 via line 14 and $CO_2$ from a source 16, such as a compressed gas storage tank, is delivered to valve 8 via line 18. Mixing valve 8 mixes the $CO_2$, water and syrup in predetermined amounts to obtain the desired carbonated beverage, and delivers the beverage to the on-site beverage dispenser via line 20.

To refill one of tanks 4 or 6 with syrup, a mobile source such as truck 22 carrying a plurality of delivery tanks 24 constructed according to the invention periodically visits the establishment. Each tank 24 has a relatively large capacity as compared to storage tanks 4 and 6 such that a single delivery tank 24 can refill a plurality of storage tanks. Typically, a single delivery tank 24 can refill three storage tanks, however, the exact ratio depends on the relative sizes of the storage and supply tanks. The tanks 24 are supported on a pallet 25 on truck 22 where pallet 25 can be leveled to compensate for inclined roadways. Specifically, pallet 25 is supported by bellows 27, hydraulic lifts or other similar leveling mechanisms. The leveling mechanism is required to ensure that the level of syrup is uniform across the tank.

Each delivery tank 24 includes a plurality of dip tubes 28, 30 and 32. In a preferred embodiment, the number of dip tubes is equal to the number of storage tanks to be refilled by the delivery tank 24, although a greater number of dip tubes may be provided. Each dip tube includes a first end extending into the tank 24 and a second end located externally thereof.

The length of each dip tube is related to the amount of syrup to be delivered. Specifically, each dip tube will deliver the volume of syrup disposed between the lower end of that dip tube and the surface 27 of the syrup. In a preferred form of the invention, syrup is delivered sequentially from the shortest to longest dip tube. Thus, the volume of syrup between surface 27 and the lower end of dip tube 28, as represented by area A, will be delivered to a first storage tank; the volume of syrup between the lower end of dip tube 28 and the lower end of dip tube 30, as represented by area B, will be delivered to the second storage tank; and the volume of syrup between the lower end of dip tube 32 and the end of dip tube 30, as represented by area C, will be delivered to the third storage tank. Because the volume of syrup delivered is directly related to length of the dip tubes, the amount of syrup delivered can be precisely determined. Moreover, syrup can be delivered from one of the longer dip tubes first thereby to increase the amount of syrup delivered, if so desired. For example, if syrup was delivered from dip tube 30 first, the volume of syrup represented by areas A and B would be delivered.

Each of dip tubes 28, 30 and 32 are provided with a quick disconnect coupling 29, 31 and 33, respectively, that can be secured to a syrup delivery line or hose 36. Valves are provided in each of dip tubes 28, 30 and 32, respectively, to control the flow of fluid therethrough. Finally, tank 24 is provided with a compressed gas delivery line, including valve and quick disconnect coupling, that can be connected to a source of compressed gas via hose 42. In the illustrated embodiment, the source of compressed gas is the $CO_2$ tank 16 that is part of the on-site beverage delivery system, however, the truck may carry its own supply of compressed gas 45, if so desired.

The operation of the supply tank of the invention will now be described. For illustrative purposes, assume that delivery tank 24 has a capacity of 75 gallons and that it is to deliver 25 gallons of syrup to three different syrup storage tanks. In such a circumstance, the volumes represented by areas A, B and C each constitute 25 gallons of syrup. As will be apparent, other delivery configurations can be achieved by altering the length of the tubes 28, 30 and 32 as dictated by delivery requirements.

The delivery tank 24 is connected to the first storage tank to be filled via fill line 26 and dip tube 28. The pressure line 40 is connected to a source of pressurized gas such as $CO_2$ source 16 via line 42. Valves 37 and 39 are closed, and valve 35 is opened. When the pressurized gas is delivered to tank 24, the syrup is forced out of tank 24 through dip tube 28. This process will continue until the level of syrup in tank 24 falls below the end of dip tube 28, at which time the pressurized gas will pass directly into dip tube 28 and the syrup in fill line 36 will be forced into storage tank 4 such that the fill line is emptied. The filling operation is then complete. Lines 36 and 42 are disconnected, and trailer 22 is moved to the location of the second storage tank to be filled.

The above-described procedure is repeated at the second tank except that the fill line 36 is connected to the second dip tube 30 and the valve on the first dip tube 28 is closed. This procedure can be repeated as many times as there are dip tubes until the supply tanks 24 are empty or all filling operations are complete.

As will be apparent from the foregoing description, the amount of syrup delivered to each storage tank is strictly metered by the length of the dip tubes. As a result, the dip tube configuration ensures delivery of precise amounts of syrup to each storage tank, automatically stops delivery when the desired amount of syrup is delivered and empties the fill line after each delivery. Moreover, the supply device of the invention can be used to deliver liquids other than carbonated beverage syrup.

While the invention has been described in some detail with respect to the drawing, it is to be understood that the foregoing description was made merely by way of example, and that the invention is to be limited only by the appended claims.

What is claimed is:

1. A liquid supply device for delivering a predetermined amount of liquid to at least one use device, comprising:
   (a) a tank for holding a supply of liquid;
   (b) a plurality of dip tubes each of a different length and each having a first end extending into the tank a selected distance for delivering a predetermined amount of liquid from each of the plurality of dip tubes, said predetermined amount being equal to the volume of liquid between the first ends of the dip tubes and the surface of the liquid;
   (c) means for propelling the predetermined amount of liquid through said plurality of dip tubes; and
   (d) means for connecting one of said plurality of dip tubes to the at least one use device to allow liquid to flow thereto, said liquid flow automatically terminating when the liquid level in the tank falls below the first end of said one of said plurality of dip tubes, whereby only said predetermined amount of liquid is delivered and thereafter emptying the connecting means of liquid.

2. The supply device according to claim 1, wherein the tank for retaining a supply of liquid comprises a vehicle mounted delivery tank.

3. The supply device according to claim 1, wherein the means for propelling includes means for pressurizing the liquid in said tank.

4. The supply device according to claim 1, wherein the means for connecting includes a fill hose.

5. The supply device according to claim 1, wherein each of said plurality of dip tubes includes a valve for controlling flow of fluid therein.

6. A liquid supply device for filling each of a plurality of use devices with a predetermined amount of liquid, comprising:
   (a) a tank for holding a supply of liquid sufficient to fill all of said use devices;
   (b) a plurality of dip tubes equal in number to the number of use devices to be filled extending into said tank, each of said dip tubes extending into said tank a different predetermined distance such that the amount of liquid supplied through each dip tube corresponds to said predetermined distance;
   (c) valve means associated with said dip tubes for selecting one of said dip tubes for a particular the filling operation;
   (d) means for delivering a compressed gas into said tank to force liquid through said selected one of said dip tubes, delivery of said liquid automatically terminating when the level of liquid in said tank falls below the end of the dip tube; and
   (e) means for connecting said selected dip tube to one of the use devices.

7. The supply device according to claim 6, wherein the liquid is delivered from said dip tubes sequentially from the shortest to longest dip tube.

8. The supply device according to claim 6, wherein said tank is carried by a vehicle.

9. A syrup supply device for delivering syrup to a plurality of beverage delivery systems of the type having at least one syrup storage tank, comprising:
   (a) a tank carried by a vehicle for holding a supply of syrup sufficient to fill the at least one storage tank of the plurality of beverage delivery systems;
   (b) a plurality of dip tubes equal in number to the number of syrup storage tanks to be filled extending into said vehicle mounted tank, each of said plurality of dip tubes having a first end extending into said tank a different predetermined distance such that the amount of syrup supplied through each of said plurality of dip tubes is related to said predetermined distance, and a second end extending from said tank;

(c) valve means associated with said plurality of dip tubes for opening and closing the dip tubes;

(d) means for forcing syrup through said selected one of said plurality of dip tubes, delivery automatically terminating when the level of syrup in said vehicle mounted tank falls below the first end of said selected dip tube; and (e) means for connecting said selected dip tube to one of the at least one storage tank.

10. A method of delivering precise amounts of liquid from a mobile tank to a use device comprising the steps of:

(a) providing a plurality of dip tubes, each extending into said vehicle mounted tank a different predetermined distance from the top thereof;

(b) connecting a selected one of said dip tubes to the use device with a hose;

(c) forcing the liquid from the tank through said selected dip tube to the use device, delivery of liquid automatically terminating when the level of liquid in the vehicle mounted tank falls below the end of said selected dip tube.

11. The method of claim 10 wherein said step of forcing the liquid from the tank includes the sub-steps of:

(a) communicating a compressed gas source with the tank to force the liquid through said selected dip tube; and (b) continuing to communicate the compressed gas with the tank after delivery of liquid to the use device, thereby to evacuate fluid from said hose.

* * * * *